(12) United States Patent
Bardman

(10) Patent No.: US 8,445,559 B2
(45) Date of Patent: May 21, 2013

(54) CORE-SHELL POLYMERIC PARTICLES

(75) Inventor: James Keith Bardman, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 660 days.

(21) Appl. No.: 12/456,903

(22) Filed: Jun. 24, 2009

(65) Prior Publication Data

US 2010/0010118 A1    Jan. 14, 2010

Related U.S. Application Data

(60) Provisional application No. 61/134,273, filed on Jul. 8, 2008.

(51) Int. Cl.
*C08L 33/26* (2006.01)

(52) U.S. Cl.
USPC ........... 523/201; 525/242; 525/243; 525/902; 525/293; 525/296

(58) Field of Classification Search
USPC .................. 523/201; 525/242, 243, 902, 293, 525/296
See application file for complete search history.

(56) References Cited

U.S. PATENT DOCUMENTS

| | | | |
|---|---|---|---|
| 5,273,824 A | 12/1993 | Hoshino et al. | |
| 5,618,888 A | 4/1997 | Choi et al. | |
| 5,639,805 A | 6/1997 | Park et al. | |
| 6,139,961 A | 10/2000 | Blankenship et al. | |
| 6,673,451 B2 | 1/2004 | Bardman et al. | |
| 2007/0043159 A1 | 2/2007 | Bardman et al. | |
| 2007/0043162 A1 | 2/2007 | Bardman et al. | |
| 2007/0255000 A1 | 11/2007 | Bardman et al. | |
| 2008/0063817 A1 * | 3/2008 | Tanaka et al. | 428/32.5 |
| 2009/0162558 A1 * | 6/2009 | Bardman et al. | 427/384 |

FOREIGN PATENT DOCUMENTS

| | | |
|---|---|---|
| EP | 0022633 A2 | 1/1981 |
| EP | 0 959 176 A1 | 11/1999 |
| EP | 1 197 503 A2 | 4/2002 |
| WO | WO 00/68304 A1 | 11/2000 |
| WO | WO 2005011995 A1 * | 2/2005 |

OTHER PUBLICATIONS

U.S. Appl. No. 61/008,397, filed Dec. 20, 2007, Bardman et al.

* cited by examiner

*Primary Examiner* — Mark Kaucher

(74) *Attorney, Agent, or Firm* — Ron D. Bakule; Karl E. Stauss

(57) ABSTRACT

A polymeric particle including a core, a first shell, and a second shell is provided:

the core including, when dry, at least one void; the first shell polymer having a calculated glass transition temperature ("Tg") greater than 50° C. and including, as polymerized units, from 15% to 60%, by weight based on the weight of the first shell, monomer selected from the group consisting of acrylonitrile, methacrylonitrile, acrylamide, methacrylamide, and mixtures thereof; and from 0.3% to 10%, by weight based on the weight of the first shell polymer, multiethylenically unsaturated monomer; and the second shell polymer having a Tg of from −60° C. to 50° C.; wherein the weight ratio of the second shell polymer to the total of all other structures of the polymeric particle is from 0.5:1 to 3:1. The particle provides binding functionality and, when dry, opacity and energy savings. A method for providing a polymeric particle and a method for providing opacity to a dry coating are also provided.

3 Claims, No Drawings

CORE-SHELL POLYMERIC PARTICLES

This application claims the benefit of priority under 35 U.S.C. §119(e) of U.S. Provisional Patent Application No. 61/134,273 filed on Jul. 8, 2008.

This invention relates to a core-shell polymeric particle suitable for use in aqueous compositions and capable of exhibiting binding functionality and useful levels of opacity in dry compositions. More particularly this invention relates to a polymeric particle including a core, a first shell, and a second shell: the core including, when dry, at least one void; the first shell polymer having a glass transition temperature (Tg) greater than 50° C. and including, as polymerized units, from 15% to 60%, by weight based on the weight of the first shell polymer, monomer selected from the group consisting of acrylonitrile, methacrylonitrile, acrylamide, methacrylamide, and mixtures thereof, and from 0.3% to 10%, by weight based on the weight of the first shell polymer, multiethylenically unsaturated monomer; and the second shell polymer having a Tg of from −60° C. to 50° C.; wherein the weight ratio of the second shell polymer to the total of all other structures of the polymeric particle is from 0.5:1 to 3:1. In addition, the invention relates to a method for forming the polymeric particle, and a method for providing opacity to a dry composition including the polymeric particle.

U.S. Patent Application No. 20070043159 discloses an aqueous dispersion of polymeric particles and a process for forming them. The particles include a first polymer particle including, when dry, at least one void and at least one second polymer substantially encapsulating the first polymer. The process for forming the polymeric particles includes forming a second shell polymer in the presence of the first polymeric particles that include a core polymer and a first shell polymer at a temperature at least 30° C. lower than the calculated Tg of the first stage shell polymer. In order to produce such polymeric particles in a sequential process, it has been necessary to cool the particles after the first shell process is completed or to wait until they cooled. This is inefficient and costly. There has been a need for a process for forming such particles at higher temperatures, particularly between 30° C. lower than the Tg of the first shell polymer and 100° C. The entire broad range of core-shell polymers previously disclosed does not meet this need. In the present invention a core-shell polymeric particle having a select composition which meets the need is provided.

The polymeric particle of the present invention is capable of exhibiting binding functionality in compositions, that is, contributing the integrity of a film including the particle, such as, for example, coating compositions and useful levels of opacity in dry compositions. Further, the polymeric particle of the present invention provides an energy savings relative to polymeric particle binders not including, when dry, at least one void, since the polymer or other matter typically occupying that void space must be produced with some expenditure of energy.

In a first aspect of the present invention, there is provided a polymeric particle comprising a core, a first shell, and a second shell: said core comprising, when dry, at least one void; said first shell polymer having a calculated glass transition temperature (Tg) greater than 50° C. and comprising, as polymerized units, from 15% to 60%, by weight based on the weight of said first shell polymer, monomer selected from the group consisting of acrylonitrile, methacrylonitrile, acrylamide, methacrylamide, and mixtures thereof; and from 0.3% to 10%, by weight based on the weight of said first shell polymer, multiethylenically unsaturated monomer; and said second shell polymer having a Tg of from −60° C. to 50° C.; wherein the weight ratio of said second shell polymer to the total of all other structures of said polymeric particle is from 0.5:1 to 3:1.

In a second aspect of the present invention there is provided a method for forming a polymeric particle comprising a core, a first shell, and a second shell comprising:

forming said core comprising, as polymerized units, from 5% to 100%, by weight, based on the weight of said core, of at least one hydrophilic monoethylenically unsaturated monomer;

forming, in the presence of said core, said first shell polymer having a Tg greater than 50° C. and comprising, as polymerized units, from 15% to 60%, by weight based on the weight of said first shell polymer, monomer selected from the group consisting of acrylonitrile, methacrylonitrile, acrylamide, methacrylamide, and mixtures thereof, and from 0.3% to 10%, by weight based on the weight of said first shell polymer, multiethylenically unsaturated monomer; and forming, in the presence of said first shell polymer, said second shell polymer having a Tg of from −60° C. to 50° C., at a temperature between 30° C. lower than the Tg of said first shell polymer and 100° C.; wherein the weight ratio of said second shell polymer to the total of all other structures of said polymeric particle is from 0.5:1 to 3:1.

In a third aspect of the present invention there is provided a method for providing opacity to a dry composition comprising: (a) forming a composition comprising a polymeric particle comprising a core, a first shell, and a second shell: said core comprising, when dry, at least one void; said first shell polymer having a calculated glass transition temperature (Tg) greater than 50° C. and comprising, as polymerized units, from 15% to 60%, by weight based on the weight of said first shell polymer, monomer selected from the group consisting of acrylonitrile, methacrylonitrile, acrylamide, methacrylamide, and mixtures thereof, and from 0.3% to 10%, by weight based on the weight of said first shell polymer, multiethylenically unsaturated monomer; and said second shell polymer having a Tg of from −60° C. to 50° C.; wherein the weight ratio of said second shell polymer to the total of all other structures of said polymeric particle is from 0.5:1 to 3:1; (b) applying said composition to a substrate; and (c) drying, or allowing to dry, said applied composition.

The present invention relates to a core-shell polymeric particle including a core, a first shell, and a second shell: the core including, when dry, at least one void; the first shell polymer having a glass transition temperature (Tg) greater than 50° C. and including, as polymerized units, from 15% to 60%, by weight based on the weight of the first shell polymer, monomer selected from the group consisting of acrylonitrile, methacrylonitrile, acrylamide, methacrylamide, and mixtures thereof, and from 0.3% to 10%, by weight based on the weight of the first shell polymer, multiethylenically unsaturated monomer; and the second shell polymer having a Tg of from −60° C. to 50° C.; wherein the weight ratio of the second shell polymer to the total of all other structures of the polymeric particle is from 0.5:1 to 3:1.

The core of the core-shell polymeric particle includes, when dry, a core having at least one void capable of scattering visible light, i.e., capable of providing opacity to a composition in which it is included. Core-shell particles including, when dry, one or more void have been disclosed in which the void was generated, for example, by complete or partial hydrolysis and dissolution of the core polymer, by swelling of the core polymer with acid, base or nonionic organic agents with restricted subsequent collapse of the particle, and the like. In a preferred embodiment the core-shell particle is formed by an aqueous multistage emulsion polymerization followed by swelling with a base. Such multistage processes are disclosed in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; and 6,896,905; as well as in European Patent Applications EP 267,726, EP 331,421 and EP 915,108.

The stages of the preferred multistage polymers of the present invention include core stage polymer (the "core"), a first shell stage polymer (the "first shell") and a second shell stage polymer (the "second shell"). The core and shells may each, independently, include more than one stage. There may also be one or more intermediate stages. An intermediate stage polymer, when present, partially or fully encapsulates the core and itself is partially or fully encapsulated by the first shell. The intermediate stage, referred to as a "tiecoat" herein, may be prepared by conducting an emulsion polymerization in the presence of the core. The first shell polymer partially or fully encapsulates the core polymer and, if present, the tiecoat polymer. The second shell polymer partially or fully encapsulates the first shell. The weight ratio of the second shell polymer to the total of all other structures of the polymeric particle is from 0.5:1 to 3:1; by "total of all other structures of the polymeric particle" herein is meant the total of optional seed polymer, the core polymer, the optional tie coat, and the first stage polymer, each optionally including a multiplicity of stages or compositions.

The cores of the preferred multistage polymers are emulsion polymers that include, as polymerized units, from 5% to 100%, preferably from 20% to 60%, and more preferably from 30% to 50% by weight, based on the weight of the core, of at least one hydrophilic monoethylenically unsaturated monomer and from 0 to 95% by weight, based on the weight of the core stage polymer, of at least one nonionic monoethylenically unsaturated monomer. Cores containing at least five percent by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence. This process also contemplates, and includes in the term "hydrophilic monoethylenically unsaturated monomer," the use of a nonpolymeric compound containing at least one carboxylic acid group which is absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomers useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred. Suitable nonpolymeric compounds containing at least one carboxylic acid group include $C_6$-$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like. Suitable nonionic monoethylenically unsaturated monomers for making the hydrophilic core polymer include styrene, .alpha.-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl(meth)acrylate, lauryl(meth)acrylate, oleyl(meth)acrylate, palmityl (meth)acrylate, stearyl(meth)acrylate and the like.

The core, whether obtained by a single stage process or a process involving several stages, has an average particle size of from 50 nm to 1.0 micron, preferably from 100 nm to 300 nm, diameter in unswollen condition. If the core is obtained from a preformed or seed polymer, the seed polymer preferably has an average particle size of from 30 nm to 200 nm.

The core may also optionally contain from 0.1% to 20% by weight, alternatively from 0.1% to 10% by weight, based on the total weight of the core, of multiethylenically unsaturated monomer, wherein the amount used is generally approximately directly proportional to the amount of hydrophilic monoethylenically unsaturated monomer used; in other words, as the relative amount of hydrophilic monomer increases, it is acceptable to increase the level of multiethylenically unsaturated monomer. Alternatively, the core polymer may contain from 0.1% to 60% by weight, based on the total weight of the core polymer, of butadiene.

Suitable multiethylenically unsaturated monomers include comonomers containing at least two addition polymerizable vinylidene groups and are alpha beta ethylenically unsaturated monocarboxylic acid esters of polyhydric alcohols containing 2-6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenyl ethers; allyl esters of .alpha.,.beta.-unsaturated mono- and dicarboxylic acids having terminal ethylenic unsaturation including allyl methacrylate, allyl acrylate, diallyl maleate, diallyl fumarate, diallyl itaconate and the like.

The first shell polymer of the multistage polymer has a Tg of greater than 50° C. and includes, as polymerized units, from 15% to 60%, preferably from 20% to 50%, and more preferably from 20% to 40%, by weight based on the weight of the first shell polymer, monomer selected from the group consisting of acrylonitrile, methacrylonitrile, acrylamide, methacrylamide, and mixtures thereof, and from 0.3% to 10%, preferably from 0.5% to 10%, by weight based on the weight of the first shell polymer, multiethylenically unsaturated monomer; Preferred is (meth)acrylonitrile. Styrene is a preferred comonomer. Other suitable monomers which may be used in the formation of the first shell polymer include monoethylenically unsaturated monomers as disclosed for the preparation of the core polymer herein, hydrophilic and nonionic. In the event that multiple first shell stages are utilized the composition of the first shell herein is taken herein as the overall composition of all of the first shells. The first shell polymer further includes, as polymerized units, from 0.3% to 10%, preferably from 0.5% to 10%, by weight based on the weight of the first shell, multiethylenically unsaturated monomer ("MEUM" herein). Suitable multiethylenically unsaturated monomers are those disclosed herein for optional use in the core polymer.

The second shell polymer of the multistage polymer has a Tg of from −60° C. to 50° C., preferably from −40° C. to 30° C., and more preferably from −20° C. to 20° C. Suitable monomers for preparation of the second shell polymer include monoethylenically unsaturated monomers as disclosed for the preparation of the core polymer herein, hydrophilic and nonionic. The second shell, optionally, further includes, as polymerized units, from 0.05% to 10%, by weight based on the weight of the second shell, multiethylenically unsaturated monomer; however, levels must be selected so as not to materially compromise film formation, i.e., not to materially compromise the contribution of the second stage polymer to functionality of the polymeric particles as binders. Suitable multiethylenically unsaturated monomers are those disclosed herein for optional use in the core polymer.

Tgs of polymers herein are those calculated herein using the Fox equation (T. G. Fox, Bull. Am. Physics Soc., Volume 1, Issue No. 3, page 123(1956)). i.e., for example, for calculating the Tg of a copolymer of monomers M1 and M2, $$1/Tg(calc.) = w(M1)/Tg(M1) + w(M2)/Tg(M2),\text{ wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

Glass transition temperatures of homopolymers may be found, for example, in "Polymer Handbook", edited by J. Brandrup and E. H. Immergut, Interscience Publishers.

The monomers used and the relative proportions thereof in the shells should be such that they are permeable to an aqueous or gaseous volatile or fixed basic swelling agent capable of swelling the core. The shells may include, as polymerized units, from 0% to 35%, preferably from 0% to 10%, and more preferably from 0.1% to 10%. by weight based on the weight of the shell, of one or more monoethylenically unsaturated monomers containing acid-functionality such as, for example, (meth)acrylic acid, (meth)acryloxypropionic acid, itaconic acid, aconitic acid, maleic acid, maleic anhydride, fumaric acid, crotonic acid, monomethyl maleate, monomethyl fumarate, monomethyl itaconate, and the like. (Meth) acrylic acid is preferred. Preferably, the proportion of acid-functional monoethylenically unsaturated monomer in the shell polymers does not exceed one-third the proportion thereof in the core polymer.

In the method for forming the polymeric core-shell polymeric particles of the presaent invention, a water-soluble free radical initiator is typically utilized in an aqueous emulsion polymerization. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01% to 3% by weight, based on the total amount of monomer and in a redox system the amount of reducing agent is preferably from 0.01% to 3% by weight based on the total amount of monomer. The type and amount of initiator may be the same or different in the various stages of the multi-stage polymerization. The temperature during various stages of the multi-stage polymerization is typically in the range of from about 10° C. to 100° C. In the case of persulfate systems, the temperature is typically in the range of from 60° C. to 90° C. In redox systems, the temperature is typically in the range of from 30° C. to 70° C. In the process of the present invention the temperature during the polymerization of the second stage polymer is between 30° C. lower than the Tg of the first shell polymer and 100° C. By "the temperature during the polymerization of the second stage polymer" is meant herein the maximum temperature of the reaction mixture during the polymerization of the second stage polymer. The product formed by the method for forming the polymeric core-shell polymeric particles of the present invention is also an embodiment of the present invention.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)laurami-de, N-lauryl-N-polyoxyethylene(3) amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyl-diphenyloxide disulfonate, nonylphenoxyethylpoly(1) ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin (C.sub.14-C.sub.16)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)-ethoxyethyl sulfate. The one or more surfactants are generally used at a level of from 0 to 3% based on the weight of the multistage polymer. The one or more surfactants can be added prior to the addition of any monomer charge, during the addition of a monomer charge, or a combination thereof.

The overall size of the multistage polymer particle is typically from 70 nm to 4.5 microns, preferably from 100 nm to 3.5 microns, more preferably from 200 nm to 2.0 microns, in unswollen condition (that is, before any neutralization to raise the pH to about 6 or higher). When the hydrophilic core polymer is fully encapsulated, it does not titrate with alkali metal bases under analytical conditions of 1 hour and at room temperature. The extent of encapsulation can be determined by removing samples during the course of the shell polymerizations and titrating with sodium hydroxide.

The void of the latex polymer particles is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), aminoalcohols. volatile lower aliphatic amines (such as trimethylamine and triethylamine), and mixtures thereof. The swelling step may occur during any of the multistage shell polymerization steps, between any of the staged polymerization steps, or at the end of the multistage polymerization process. Providing the multistage emulsion polymer, monomer and swelling agent under conditions wherein there is no substantial polymerization of the monomer can enhance the extent of swelling of the multistage emulsion polymer as is taught in U.S. Pat. Nos. 6,020,435 and 6,252,004.

The weight ratio of core to an intermediate stage or tiecoat, if present, is typically in the range of from 1:0.5 to 1:10, preferably in the range of from 1:1 to 1:7. The weight ratio of core to first shell is typically in the range of from 1:5 to 1:20, preferably in the range of from 1:8 to 1:15. The weight ratio of second shell to the total of all previous stages or previously formed structures of the polymeric particle, i.e., for example, optional seed, core, optional tiecoat, and first shell, is from 0.5:1 to 3:1, preferably from 0.75:1 to 2.5:1. The lower the weight ratio of second shell to the total of all previous stages, the less likely a composition including the polymeric particle will be to form a film without additional binder being present; one skilled in the art will recognize that film formation will be affected by, inter alia, the use of coalescent or plasticizer and the temperature during the film formation process.

In one embodiment of the present invention there is provided a method for providing opacity to a dry composition including the polymeric particles of the invention. In one embodiment of the present invention, there are provided certain aqueous compositions including the core-shell polymeric particle of the invention and, optionally an inorganic particle, which compositions may find utility, for example, as sunscreen compositions or as coating compositions. The amount of inorganic particles included in an aqueous coating composition is from 0 to 95 volume %, based on the total dry volume of the composition and inorganic particles. Typically, the coating composition, when used to prepare dried coatings, has a solids level in the range of from 20 to 50 volume %, based on the volume of the composition. A suitable viscosity range for such compositions is from 50 to 130 Krebs units (KU), preferably from 70 to 120 KU, and more preferably from 90 to 110 KU.

Inorganic particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. The inorganic particles may have a particle size which is from 10 to 1000 nm, preferably from 10 to 500 nm. Examples of preferred inorganic particles with a particle size of less than 1000 nm include zinc oxide, silicon oxide, titanium dioxide, and iron oxide.

The composition may optionally contain organic pigment particles. Suitable organic pigments also include plastic pigments such as solid bead pigments and microspheres not of the present invention containing voids or vesicles. Examples of solid bead pigments include polystyrene and polyvinyl chloride beads. Examples of microsphere pigments, which include polymer particles containing one or more voids include Ropaque™ opaque polymers and vesiculated polymer particles, as disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccospherev hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The compositions including inorganic particles are prepared by techniques which are well known in the coatings art. First, the inorganic particles are typically are well dispersed in a medium under high shear such as is afforded by a COWLES® mixer. Then, the core-shell polymeric particles are added under low shear stirring along with other coatings adjuvants as desired. The composition may further contain film-forming or non-film-forming solution polymer, and conventional coatings adjuvants such as, for example, driers, plasticizers, curing agents, neutralizers, thickeners, rheology modifiers, biocides, antifoaming agents, UV absorbers, fluorescent brighteners, light or heat stabilizers, chelating agents, dispersants, colorants, waxes, water-repellants, and anti-oxidants.

Conventional coatings application methods such as, for example, brushing, rolling, and spraying methods such as, for example, air-atomized spray, air-assisted spray, airless spray, high volume low pressure spray, and air-assisted airless spray may be used to apply the composition of this invention. Additionally, for some systems, other application techniques may be used to apply the composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, paper, paperboard, leather, composites, and cementitious substrates. Drying is typically allowed to proceed under ambient conditions such as, for example, at 0° C. to 35° C. but may be accelerated with higher temperatures, air flow, low humidity, actinic energy such as, for example, e-beam, UV, visible, infrared, or microwave radiation, or sonic energy.

Abbreviations:
SDS=Sodium dodecyl benzene sulfonate (23%)
Fes-32=Disponil Fes-32 (30%)
LOFA=Linseed oil fatty acid
ALMA=Allyl methacrylate
DVB=Divinyl benzene (80%)
STY=Styrene
AN=Acrylonitrile
AA=Acrylic acid
MAA=Methacrylic acid
MMA=Methyl methacrylate
BA=Butyl acrylate
EDTA=Ethylene Diamine Tetra acetic acid, tetra sodium salt
t-BHP=tert-Butyl Hydroperoxide
IAA=Isoascorbic acid
NaPS=Sodium persulfate
NH4OH=Ammonium hydroxide (28%)
NaOH=Sodium hydroxide (50% in water)
DI water=deionized water CORE 1 A core polymer was prepared following the procedure of Examples 1-16 in U.S. Pat. No. 6,020,435. The filtered dispersion had a solids content of 32.0% and an average particle size of 135 nm.

CORE 2 A core polymer was prepared following the procedure of Examples 1-16 in U.S. Pat. No. 6,020,435. The filtered dispersion had a solids content of 31.9% and an average particle size of 95 nm.

POLYMER 1 Preparation of a core/tiecoat/(first) shell polymer particle. A 5-liter, four necked round bottom flask was equipped with paddle stirrer, thermometer, nitrogen inlet, and reflux condenser. DI water, 950 grams, was added to the kettle and heated to 89° C. under a nitrogen atmosphere. To the heated kettle water was added 6.0 grams NaPS dissolved in 40 grams of DI water. This was immediately followed by 390.6 grams of CORE 1. A monomer emulsion (ME I) which was prepared by mixing 125 grams of DI water, 8.3 grams of SDS, 125.0 grams of STY, 110.0 grams of MMA, and 15.0 grams of MM was added to the kettle over a period of 60 minutes at a temperature of 78° C. Upon completion of ME I, a second monomer emulsion (ME II) was prepared by mixing 500 grams of DI water, 22.5 grams of SDS, 1462.5 grams of STY, 22.5 grams of MM, 7.5 grams of LOFA, and 18.8 grams of DVB. Monomer Emulsion II (ME II) was added to the kettle along with a separate mixture of 1.6 grams of NaPS dissolved in 90 grams of DI water over 60 minutes. The temperature of the reaction mixture was allowed to increase to 92° C. Upon completion of the ME II and co-feed, the reaction mixture was held for 30 minutes at 85° C. and then cooled to room temperature and filtered to remove any coagulum formed. The final unneutralized latex had a solids content of 46.2%, an average particle size of 375 nm, and a pH of 2.2.

COMPARATIVE EXAMPLE A

A 5-liter, four necked round bottom flask was equipped with paddle stirrer, thermometer, nitrogen inlet, and reflux condenser. 1298.7 grams of First polymer #1 was added to the kettle along with 220 grams of DI water and the temperature was adjusted to 25° C. A monomer emulsion (ME I) was prepared by mixing 150 grams of DI water, 8.0 grams of SDS, 208.0 grams of MMA, 6.0 grams of MM, and 296.0 grams of BA. With the kettle temperature at 25° C., a solution of 20 grams of 0.1% ferrous sulfate mixed with 2 grams of 1% EDTA was added to the kettle. Next, co-feeds including a solution of 1.90 grams of t-BHP mixed with 50 grams of DI water, along with a separate solution of 1.3 grams of IAA mixed with 50 grams of DI water were both added to the kettle at a rate of 1.0 gram/minute. Two minutes after the start of the co-feed solutions, ME I, which was prepared previously was added to the kettle at a rate of 15 grams/minute. There was no external heat applied to the reaction at this point. The temperature of the kettle was allowed to slowly increase over the first fifteen minutes of the ME I feed. After 15 minutes the ME feed rate was increased to 30 grams/minute and external heat was added to the reaction. Upon completion of the ME I feed, the co-feeds were stopped and the reaction was held for 5 minutes. The temperature of the reaction at this point was 70° C. Next, 300 grams of hot DI water (90° C.) was added to the kettle along with a mixture of 5.0 grams of NH4OH mixed with 5.0 grams of DI water. At this point ME II, which had been prepared previously by mixing 25.0 grams of DI water, 2.0 grams SDS, 52.0 grams of BA, 38.0 grams of MMA, and 2.5 grams of 4-hydroxy TEMPO was fed to the kettle over 5 minutes. Immediately after the ME II feed was complete, 30.0 grams of NH4OH mixed with 30 grams of DI water was added to the kettle over 2 minutes. When the NH4OH feed was complete the batch was held for 5 minutes. The co-feed solutions were then resumed at a rate of 1.0 gram/minute until their completion. The dispersion was then cooled to 25° C. and filtered to remove any coagulum. The filtered dispersion had a solids content of 40.6%. The S/Mil was measured to be 0.81 with collapse of 8%.

COMPARATIVE EXAMPLE B

A 5-liter, four necked round bottom flask was equipped as in Comparative Example A. DI water, 560 grams, was added to the kettle and heated to a temperature of 89° C. under a nitrogen atmosphere. To the heated kettle water was added 2.6 grams NaPS dissolved in 20 grams of DI water. This was immediately followed by 173.3 grams of core #1 (135 nm). A monomer emulsion (ME I) which was prepared by mixing 55.0 grams of DI water, 3.7 grams of SDS, 55.0 grams of STY, 48.4 grams of MMA, and 6.6 grams of MAA was added to the kettle over a period of 60 minutes at a temperature of 78° C. Upon completion of ME I, a second monomer emulsion (ME II) was prepared by mixing 220.0 grams of DI water, 9.9 grams of SDS, 643.5 grams of STY, 9.9 grams of MAA, 3.3 grams of LOFA, and 8.3 grams of DVB. Monomer Emulsion II (ME II) was then added to the kettle along with a separate mixture of 0.70 grams of NaPS dissolved in 40 grams of DI water over 60 minutes. The temperature of the reaction mixture was allowed to increase to 92° C. Upon completion of the ME II and NaPS co-feed, the reaction was cooled to 60° C. When the kettle temperature reached 60° C., a solution of 20 grams of 0.1% ferrous sulfate mixed with 2 grams of 1% EDTA was added to the kettle. Next, co-feeds including a solution of 2.6 grams of t-BHP mixed with 70 grams of DI water, along with a separate solution of 1.8 grams of IAA mixed with 70 grams of DI water were both added to the kettle at a rate of 0.80 grams/minute. Two minutes after the start of the co-feed solutions, ME III, which was prepared previously by mixing 210 grams of DI water, 11.7 grams of SDS, 406.5 grams of BA, 286.2 grams of MMA, and 8.3 grams of MAA was added to the kettle over 60 min while allowing the temperature to rise to 78° without providing any external heat. Upon completion of ME III, the co-feed solutions were stopped and the batch was held for 5 minutes at 78°. A solution of 5.0 grams of NH4OH mixed with 5.0 grams of DI water was then added to the kettle along with 600 grams of hot DI water (90° C.). At this point ME IV, which had been prepared previously by mixing 37.0 grams of DI water, 2.1 grams SDS, 72.0 grams of BA, 52.0 grams of MMA, and 2.5 grams of 4-hydroxy TEMPO was fed to the kettle over 7 minutes. Immediately after the ME IV feed was complete, 40.0 grams of NH4OH mixed with 40 grams of DI water was added to the kettle over 2 minutes. When the NH4OH feed was complete the batch was held for 5 minutes. The co-feed solutions were then resumed at a rate of 1.0 gram/minute until their completion. The dispersion was then cooled to 25° C. and filtered to remove any coagulum. The filtered dispersion had a solids content of 41.5%. The S/Mil was measured to be 0.84 with collapse of 18%.

EXAMPLE 1

Example 1 was prepared according to the process of Comparative Example B with the exceptions that the composition of ME I consisted of 55.0 grams of DI water, 3.7 grams of SDS, 81.4 grams of STY, 22.0 grams of AN, and 6.6 grams of MAA. And the composition of ME II consisted of 220.0 grams of DI water, 9.9 grams of SDS, 521.4 grams of STY, 132.0 grams of AN, 3.3 grams of LOFA, and 8.3 grams of DVB. The filtered dispersion had a solids content of 40.6%. The S/Mil was measured to be 0.70 with collapse of 7%.

COMPARATIVE EXAMPLE C

To a 5-liter, four necked round bottom flask equipped as in Comparative Example A was added 660 grams of DI water which was heated to a temperature of 89° C. under a nitrogen atmosphere. To the heated kettle water was added 2.6 grams NaPS dissolved in 20 grams of DI water. This was immediately followed by 171.8 grams of core #1 (135 nm). A monomer emulsion (ME I) which was prepared by mixing 275.0 grams of DI water, 13.6 grams of SDS, 754.6 grams of STY, and 3.9 grams of LOFA was fed to the reactor at a rate 4.0 grams/minute at a temperature of 78° C. Two minutes after the start of ME I, a solution of 7.7 grams of AA mixed with 40 grams of DI water was added to the reactor. After 40 minutes of feeding ME I at a temperature of 78° C., the feed rate was increased to 9 grams/minute and a co-feed solution of 0.7 grams of NaPS in 50 grams of DI water was begun to the reactor at a rate of 1.0 gram/minute. At this point 9.6 grams of DVB was added to ME I. After another 15 minutes the ME I feed rate was increased again to 18 grams/minute and the temperature of the reaction was allowed to rise to 92° C. Upon completion of ME I and the NaPS co-feed, the reaction was cooled to 62° C. While cooling a solution of 20 grams of 0.1% ferrous sulfate mixed with 2 grams of 1% EDTA was added to the kettle at a temperature of 75° C. Next, at a temperature of 70° C., co-feeds including a solution of 2.6 grams of t-BHP mixed with 70 grams of DI water, along with a separate solution of 1.8 grams of IAA mixed with 70 grams of DI water were both added to the kettle at a rate of 0.80 grams/minute. Three minutes after the start of the co-feeds solutions, ME II, which was prepared previously by mixing 210 grams of DI water, 11.7 grams of SDS, 406.5 grams of BA, 286.2 grams of MMA, and 8.3 grams of MAA was added to the kettle over 60 min while allowing the temperature to rise to 78° without providing any external heat. Upon completion of ME II, the co-feed solutions were stopped and the batch was held for 5 minutes at 78°. A solution of 5.0 grams of NH4OH mixed with 5.0 grams of DI water was then added to the kettle along with 500 grams of hot DI water (90° C.). At this point, ME III, which had been prepared previously by mixing 37.0 grams of DI water, 2.1 grams SDS, 72.0 grams of BA, 52.0 grams of MMA, and 2.5 grams of 4-hydroxy TEMPO was fed to the kettle over 7 minutes. Immediately after the ME III feed was complete, 40.0 grams of NH4OH mixed with 40 grams of DI water was added to the kettle over 2 minutes. When the NH4OH feed was complete (Temperature 73° C.) the batch was held for 5 minutes. The co-feed solutions were then resumed at a rate of 1.0 gram/minute until their completion. The dispersion was then cooled to 25° C. and filtered to remove any coagulum. The filtered dispersion had a solids content of 41.25. The S/Mil was measured to be 0.63 with collapse of 54%.

COMPARATIVE EXAMPLE D

Comparative Example D was prepared according to the process of Comparative Example C with the exception that the composition of ME I consisted of 275.0 grams of DI water, 13.6 grams of SDS, 677.6 grams of STY, 77.0 grams of AN, and 3.9 grams of LOFA. The filtered dispersion had a solids content of 41.1%. The S/Mil was measured to be 0.97 with collapse of 43%.

EXAMPLE 2

Example 2 was prepared according to the process of Comparative Example C with the exception that the composition of ME I consisted of 275.0 grams of DI water, 13.6 grams of SDS, 600.6 grams of STY, 154 grams of AN, and 3.9 grams of LOFA. The filtered dispersion had a solids content of 41.2%. The S/Mil was measured to be 0.87 with collapse of 6%.

COMPARATIVE EXAMPLE E

Comparative Example E was prepared according to the process of Comparative Example C with the exception that the composition of ME I consisted of 275.0 grams of DI water, 13.6 grams of SDS, 754.6 grams of STY, 9.6 grams of DVB, and 3.9 grams of LOFA. The DVB was added to the ME I composition initially and not added during the ME I feed. The filtered dispersion had a solids content of 40.75. The S/Mil was measured to be 0.82 with collapse of 15%.

EXAMPLE 3

Example 3 was prepared according to the process of Comparative Example E with the exception that the composition of ME I consisted of 275.0 grams of DI water, 13.6 grams of SDS, 600.6 grams of STY, 154 grams of AN, 9.6 grams of DVB, and 3.9 grams of LOFA. The DVB was added to the ME I composition initially and not added during the ME I feed. The filtered dispersion had a solids content of 41.5%. The S/Mil was measured to be 0.69 with collapse of 0%.

EXAMPLE 4

Example 4 was prepared according to the process of Example 3 with the exception that after the ME I feed and co-feed were complete, the reaction was cooled to 78° C. A monomer emulsion (ME II) with the same composition as ME II in Example 2 was fed to the reactor over 60 minutes. A solution of 2.0 grams of NaPS mixed in 60.0 grams of DI water was cofed to the reactor at a rate of 1 gram/minute. The temperature was allowed to rise to 86° C. during the feed. The filtered dispersion had a solids content of 41.7%. The S/Mil was measured to be 0.77 with collapse of 0%.

COMPARATIVE EXAMPLE F

Comparative Example F was prepared according to the process of Comparative Example E with the exception that 172.4 grams CORE 2 was used. The filtered dispersion had a solids content of 41.2%. The S/Mil was measured to be 0.25 with collapse of 75%.

EXAMPLE 5

Example 5 was prepared according to the process of Example 3 with the exception that 172.4 grams of CORE 2 was used. The filtered dispersion had a solids content of 41.4%. The S/Mil was measured to be 0.46 with collapse of 9%.

EXAMPLE 6

Evaluation of opacity (S/mil) and collapse of voids in Comparative Examples A-F and Examples 1-5. A 7 mil wet film was drawn down over a black vinyl scrub chart (Leneta #P121010N). The black vinyl scrub chart had been measured for thickness (in mils) in four defined areas using, for example, an Ames gauge (#2-212C) available from the Ames Corporation of Waltham, Mass. The film was dried for two hours in a low relative humidity (<30% Relative Humidity, where if Relative Humidity is <30% during drying, opacity will not change substantially) chamber or room. The reflectance of the dry film was measured by a reflectometer, Gardner Instrument Reflectometer (BYK-Gardner of Columbia, Md.), over the four defined areas. The thickness of the film was also determined over each of the defined areas using the Ames gauge and the average taken. The procedure was repeated with the exception that the film was dried overnight at 25° C./80% Relative Humidity in a temperature/humidity chamber (Hotpack, Model #417532 available from SP Industries, Inc. of Warminster, Pa.) and then dried at <40% Relative Humidity for one hour in a low humidity chamber/room.

The % collapse was calculated based on scattering S/Mil (opacity) at 80% RH vs S/mil at <30% RH. In Example 6 S/mil was determined using blends of 3.0 grams (solids) polymeric particles mixed with 7.0 grams (solids) of film forming binder RHOPLEX™ AC-264. Comparative Examples A-F and Examples 1-5 have a weight ratio of the second shell to the total of all other structures of the polymeric particle of 1:1 and do not form neat films under the test conditions.

TABLE 6.1

Changes in Process, S/Mil, and % Collapse of Comparative Examples A and B and Example 1.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp A | 1/2/12//15* | 25-70 | 0 | 1% in 12 | 0.81 | 8 |
| Comp B | 1/2/12//15 | 60-78 | 0 | 1% in 12 | 0.84 | 18 |
| 1 | 1/2/12//15 | 60-78 | 20 | 1% in 12 | 0.70 | 7 |

Stage Ratio (parts by solid weight)
1 = Polymer core
2 = Polymer tiecoat
12 = First polymer shell
15 = Second polymer shell
*Polymer 1 made separately Comparative Example A was prepared by the process of US Patent Application No. 20070043159. The second polymer shell was formed in the presence of first polymer at a second shell feed temperature of 25-70° C., resulting in polymer particles which exhibited superior collapse, i.e., superior retention of void volume. At a second shell feed temperature of 60-78° C., Comparative Example B, resulted in polymer particles which exhibited more collapse, i.e., less retention of void volume than Comparative Example A. Incorporating 20% AN in the first polymer shell, Example 1, resultrd in polymer particles having superior collapse resistance when the polymerization temperature range of the second polymer shell was increased to 60-78° C. vs. Comparative Example B.

TABLE 6.2

Changes in Process, S/Mil, and % Collapse of Comparative Examples C and D and Example 2.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp. C | 1/14//15 | 60-78 | 0 | 1% in last 12 | 0.63 | 54 |
| Comp. D | 1/14//15 | 60-78 | 10 | 1% in last 12 | 0.97 | 43 |

TABLE 6.2-continued

Changes in Process, S/Mil, and % Collapse of Comparative Examples C and D and Example 2.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| 2 | 1/14//15 | 60-78 | 20 | 1% in last 12 | 0.87 | 6 |

Stage Ratio (parts by solid weight)
1 = Polymer core
14 = First polymer shell
15 = Second polymer shell The examples in Table 6.2 were formed without a tiecoat along with polymerizing the second shell at an elevated temperature range (60-78° C.). Comparative Examples C and D (0 and 10% AN incorporated in the First Polymer Shells respectively) had poor collapse resistance. Example 2, containing 20% AN in the First Polymer Shell, had superior collapse resistance vs. Comparative Examples C and D.

TABLE 6.3

Changes in Process, S/Mil, and % Collapse of Comparative Examples C and E and Examples 3 and 4.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp. C | 1/14//15 | 60-78 | 0 | 1% in last 12 | 0.63 | 54 |
| Comp. E | 1/14//15 | 60-78 | 0 | 1% in 14 | 0.82 | 15 |
| 3 | 1/14//15 | 60-78 | 20 | 1% in 14 | 0.69 | 0 |
| 4 | 1/14//15 | 78-86 | 20 | 1% in 14 | 0.77 | 0 |

Stage Ratio (parts by solid weight)
1 = Polymer core
14 = First polymer shell
15 = Second polymer shell The multi-ethylenically-unsaturated monomer ("MEUM" herein) in Comparative Example C was staged in the last 12 parts of the First Polymer Shell. Adding DVB throughout the First Polymer Shell (Comparative Example E) improved collapse resistance vs Comparative Example C. Incorporating 20% AN to the First Polymer Shell containing 1% DVB throughout, Example 3, resulted in superior collapse resistance vs. Comparative Example E. Example 4 also shows superior collapse resistance when an elevated (78-86°) Second Shell feed temperature was used.

TABLE 6.4

Changes in Process, S/Mil, and % Collapse of Comparative Example F and Example 5.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp. F | 1/14//15 | 60-78 | 0 | 1% in 14 | 0.25 | 75 |
| 5 | 1/14//15 | 60-78 | 20 | 1% in 14 | 0.46 | 9 |

Stage Ratio (parts by solid weight)
1 = Polymer core
14 = First polymer shell
15 = Second polymer shell Comparative Example F and Example 5 were prepared using Core 2 (95 nm). Example 5 containing 20% AN in the First Stage Polymer had superior collapse resistance vs. Comparative Example F.

COMPARATIVE EXAMPLE G

A 5-liter, four necked round bottom flask was equipped with paddle stirrer, thermometer, nitrogen inlet, and reflux condenser. 1299.0 grams of Polymer 1 was added to the kettle and the temperature was adjusted to 25° C. A monomer emulsion (ME I) was prepared by mixing 306 grams of DI water, 17.0 grams of SDS, 416.4 grams of MMA, 12.0 grams of MAA, and 591.60 grams of BA. With the kettle temperature at 25° C., a solution of 20 grams of 0.1% ferrous sulfate mixed with 2 grams of 1% EDTA was added to the kettle. Next, co-feeds including a solution of 3.7 grams of t-BHP mixed with 100 grams of DI water, along with a separate solution of 2.6 grams of IAA mixed with 100 grams of DI water were both added to the kettle at a rate of 1.2 gram/minute. Two minutes after the start of the co-feed solutions, ME I, which was prepared previously was added to the kettle over 60 minutes. There was no external heat applied to the reaction throughout the ME 1 feed. The temperature of the kettle was allowed to rise to 78° C. Upon completion of the ME I feed, the co-feeds were stopped and the reaction was held for 5 minutes. The temperature of the reaction at this point was 77° C. Next, a solution of 5.0 grams of NH4OH mixed with 5.0 grams of DI water was added to the kettle along with 400 grams of hot DI water (90° C.). At this point ME II, which had been prepared previously by mixing 54.0 grams of DI water, 3.0 grams SDS, 104.4 grams of BA, 75.6 grams of MMA, and 2.5 grams of 4-hydroxy TEMPO was fed to the kettle over 5 minutes. Immediately after the ME II feed was complete, 35.0 grams of NH4OH mixed with 35 grams of DI water was added to the kettle over 2 minutes. When the NH4OH feed was complete the batch was held for 5 minutes. The co-feed solutions were then resumed at a rate of 1.2 grams/minute until their completion. The dispersion was then cooled to 25° C. and filtered to remove any coagulum. The filtered dispersion had a solids content of 45.4%. The S/Mil was measured to be 1.88 with collapse of 16%.

COMPARATIVE EXAMPLE H

Comparative Example H was prepared according to the process of Comparative Example G with the exception that after Polymer 1 was added to the kettle, the temperature was adjusted to 60° C. The filtered dispersion had a solids content of 45.6%. The S/Mil was measured to be 1.66 with collapse of 67%.

COMPARATIVE EXAMPLE I

To a 5-liter, four necked round bottom flask equipped as in Comparative Example A was added 500 grams of DI water which was heated to a temperature of 89° C. under a nitrogen atmosphere. To the heated kettle water was added 1.9 grams NaPS dissolved in 20 grams of DI water. This was immediately followed by 125.0 grams of CORE 1 (135 nm). A monomer emulsion (ME I) which was prepared by mixing 200 grams of DI water, 10.0 grams of SDS, 548.8 grams of STY, 2.8 grams of LOFA, and 7.0 grams of DVB, was fed to the reactor at a rate 3.0 grams/minute at a temperature of 78° C. Two minutes after the start of ME I a solution of 5.6 grams of M mixed with 25 grams of DI water was added to the reactor. After 40 minutes of feeding ME I at a temperature of 78° C., the feed rate was increased to 6.5 grams/minute and a co-feed solution of 0.5 grams of NaPS in 30 grams of DI water was begun to the reactor at a rate of 0.6 gram/minute. After another 15 minutes the ME I feed rate was increased again to 13 grams/minute and the temperature of the reaction was allowed to rise to 92° C. Upon completion of ME I and the NaPS co-feed, the reaction was cooled to 62° C. While cooling a solution of 20 grams of 0.1% ferrous sulfate mixed with 2 grams of 1% EDTA was added to the kettle at a temperature of 75° C. Next, at a temperature of 70° C., co-feeds including a solution of 3.7 grams of t-BHP mixed with 100 grams of DI water, along with a separate solution of 2.6 grams of IAA mixed with 100 grams of DI water were both added to the kettle at a rate of 1.20 grams/minute. Two minutes after the start of the co-feeds solutions, ME II, which was prepared previously by mixing 306 grams of DI water, 17.0 grams of SDS, 591.6 grams of BA, 416.4 grams of MMA, and 12.0 grams of MAA was added to the kettle over 60 min while allowing the temperature to rise to 78° without providing any external heat. Upon completion of ME II, the co-feed solutions were stopped and the batch was held for 5 minutes at 78°. A solution of 5.0 grams of NH4OH mixed with 5.0 grams of DI water was then added to the kettle along with 400 grams of hot DI water (90° C.). At this point ME III, which had been prepared previously by mixing 54.0 grams of DI water, 3.0 grams SDS, 104.4 grams of BA, 75.6 grams of MMA, and 2.5 grams of 4-hydroxy TEMPO was fed to the kettle over 7 minutes. Immediately after the ME III feed was complete, 35.0 grams of NH4OH mixed with 35 grams of DI water was added to the kettle over 2 minutes. When the NH4OH feed was complete (Temperature 72° C.) the batch was held for 5 minutes. The co-feed solutions were then resumed at a rate of 1.2 gram/minute until their completion. The dispersion was then cooled to 25° C. and filtered to remove any coagulum. The filtered dispersion had a solids content of 45.2%. The S/Mil was measured to be 1.54 with collapse of 26%.

EXAMPLE 7

Example 7 was prepared according to the process of Comparative Example I with the exception that the composition of ME I consisted of 200 grams of DI water, 10.0 grams of SDS, 464.8 grams of STY, 84.0.0 grams of AN, 7.0 grams of DVB, and 2.8 grams of LOFA. The filtered dispersion had a solids content of 41.1%. The S/Mil was measured to be 1.51 with collapse of 2%.

EXAMPLE 8

Example 8 was prepared according to the process of Comparative Example I with the exception that the composition of ME I consisted of 200 grams of DI water, 10.0 grams of SDS, 436.8 grams of STY, 112.0 grams of AN, 7.0 grams of DVB, and 2.8 grams of LOFA. The filtered dispersion had a solids content of 45.5%. The S/Mil was measured to be 1.60 with collapse of 12%.

EXAMPLE 9

Example 9 was prepared according to the process of Example 8 with the exception that after the ME I feed and co-feed were complete, the reaction was cooled to 84° C. A solution of 3.5 grams of NaPS mixed in 90.0 grams of DI water was fed to the reactor at a rate of 1.7 gram/minute. A monomer emulsion (ME II) with the same composition as ME II in Example 12 was fed to the reactor over 60 minutes. The temperature was allowed to rise to 86° C. during the feed. The filtered dispersion had a solids content of 46.2%. The S/Mil was measured to be 1.75 with collapse of 10%.

COMPARATIVE EXAMPLE J

Comparative Example J was prepared according to the process of Example 9 with the exception that the composition of ME I consisted of 200 grams of DI water, 10.0 grams of SDS, 548.8 grams of STY, 7.0 grams of DVB, and 2.8 grams of LOFA. The filtered dispersion had a solids content of 46.0%. The S/Mil was measured to be 1.59 with collapse of 70%.

COMPARATIVE EXAMPLE K

Example 12 was prepared according to the process of Example 10 with the exception that the composition of ME I consisted of 125 grams of DI water, 10.0 grams of SDS, 385.0 grams of STY, 168.0 grams of AN, 1.4 grams of ALMA, and 2.8 grams of LOFA. The filtered dispersion had a solids content of 47.6%. The S/Mil was measured to be 1.80 with collapse of 24%.

EXAMPLE 10

Example 10 was prepared according to the process of Comparative Example I with the exception that the composition of ME I consisted of 125 grams of DI water, 10.0 grams of SDS, 380.8 grams of STY, 168.0 grams of AN, 7.0 grams of DVB, and 2.8 grams of LOFA. Also the composition of ME II consisted of 240 grams of DI water, 17.0 grams of SDS, 591.6 grams of BA, 416.4 grams of MMA and 12.0 grams of MAA. The filtered dispersion had a solids content of 47.4%. The S/Mil was measured to be 1.28 with collapse of 2%.

EXAMPLE 11

Example 11 was prepared according to the process of Example 10 with the exception that the composition of ME I consisted of 125 grams of DI water, 10.0 grams of SDS, 383.6 grams of STY, 168.0 grams of AN, 3.5 grams of DVB, and 2.8 grams of LOFA. The filtered dispersion had a solids content of 47.2%. The S/Mil was measured to be 1.70 with collapse of 7%.

EXAMPLE 12

Evaluation of opacity (S/mil) and collapse of voids in Comparative Examples G-K and Examples 7-11. S/Mil (opacity) was determined as in Example 6 using the polymeric particles without any co-binder. Comparative Examples G-K and Examples 7-11 have a weight ratio of second shell to the total of all other structures of the polymeric particle of 1:2 and form neat films under the test conditions.

TABLE 12.1

Changes in Process, S/Mil, and % Collapse of Comparative Examples G-I and Examples 7-8.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp G | 1/2/12//30* | 25-78 | 0 | 1 DVB in 12 | 1.88 | 16 |
| Comp H | 1/2/12//30* | 60-78 | 0 | 1 DVB in 12 | 1.67 | 67 |
| Comp. I | 1/14//30 | 60-78 | 0 | 1 DVB in 14 | 1.54 | 26 |
| 7 | 1/14//30 | 60-78 | 15 | 1 DVB in 14 | 1.51 | 2 |
| 8 | 1/14//30 | 60-78 | 20 | 1 DVB in 14 | 1.60 | 12 |

Stage Ratio (parts by solid weight)
1 = Polymer core
2 = Polymer tiecoat
12 or 14 = First polymer shell
30 = Second polymer shell
*Polymer 1 made separately Comparative Example G was prepared by the process of US Patent Application No. 20070043159. The second polymer shell was added to the first polymer at a temperature range of 25-78° C., resulting in polymer particles which exhibited increased collapse resistance vs. polymer particles prepared at a second shell feed temperature of 60-78° C., as in Comparative Example H. The multi-ethylenically-unsaturated monomer (MEUM) in Comparative Examples G and H was staged in the last 12 parts of the First Polymer Shell. Adding DVB throughout the First Polymer Shell (Comparative Example I) improved collapse resistance vs. Comparative Example H. However, incorporating 15% AN in the first polymer shell as in Example 7, resulted in polymer particles having superior collapse resistance when the polymerization temperature range of the second polymer shell was increased to 60-78° C. vs. Comparative Examples H and I.

TABLE 12.2

Changes in Process, S/Mil, and % Collapse of Comparative Example J and Example 9.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| Comp. J | 1/14//30 | 84-86 | 0 | 1 DVB in 14 | 1.59 | 70 |
| 9 | 1/14//30 | 84-86 | 20 | 1 DVB in 14 | 1.75 | 10 |

Stage Ratio (parts by solid weight)
1 = Polymer core
14 = First polymer shell
30 = Second polymer shell At an elevated second shell polymerization temperature (84-86° C.) Example 9, incorporating 20% AN in the first polymer shell, exhibited superior collapse resistance vs. Comparative Example J.

TABLE 12.3

Changes in Process, S/Mil, and % Collapse of Comparative Example K and Examples 10 and 11.

| Example | Stage Ratio by Parts | Second Shell Feed Temp ° C. | % AN in First Polymer Shell | % MEUM in First Polymer Shell | S/Mil | % Collapse |
|---|---|---|---|---|---|---|
| 10 | 1/14//30 | 60-78 | 30 | 1 DVB in 14 | 1.28 | 2 |
| 11 | 1/14//30 | 60-78 | 30 | 0.5 DVB in 14 | 1.70 | 7 |
| Comp. K | 1/14//30 | 60-78 | 30 | 0.25 ALMA in 14 | 1.80 | 24 |

Stage Ratio (parts by solid weight)
1 = Polymer core
14 = First polymer shell
30 = Second polymer shell Examples 10 and 11 (incorporating 1% and 0.5% DVB respectively) exhibited superior collapse resistance vs. Comparative Example K that contained a low level of MEUM (0.25% ALMA) in the first polymer shell.

EXAMPLE 13

To a 5-liter, four necked round bottom flask equipped as in Comparative Example A was added 500 grams of DI water which was heated to a temperature of 89° C. under a nitrogen atmosphere. To the heated kettle water was added 1.9 grams NaPS dissolved in 20 grams of DI water. This was immediately followed by 125.0 grams of core #1 (135 nm). A monomer emulsion (ME I) which was prepared by mixing 125 grams of DI water, 10.0 grams of SDS, 436.8 grams of STY, 112.0 grams of AN, 2.8 grams of LOFA, and 7.0 grams of DVB, was fed to the reactor at a rate 3.0 grams/minute at a temperature of 78° C. Two minutes after the start of ME I a solution of 5.6 grams of AA mixed with 25 grams of DI water was added to the reactor. After 40 minutes of feeding ME I at a temperature of 78° C., the feed rate was increased to 6.5 grams/minute and a co-feed solution of 0.5 grams of NaPS in 30 grams of DI water was begun to the reactor at a rate of 0.6 gram/minute. After another 15 minutes the ME I feed rate was increased again to 13 grams/minute and the temperature of the reaction was allowed to rise to 92° C. Upon completion of ME I and the NaPS co-feed, the reaction was cooled to 72° C. While cooling, a solution of 20 grams of 0.1% ferrous sulfate mixed with 2 grams of 1% EDTA was added to the kettle at a temperature of 80° C. Next, at a temperature of 76° C., co-feeds including a solution of 1.9 grams t-BHP and 2.6 grams NaPS mixed with 100 grams of DI water, along with a separate solution of 2.6 grams of IAA mixed with 100 grams of DI water were both added to the kettle at a rate of 1.20 grams/minute. Two minutes after the start of the co-feeds solutions, at a temperature of 72° C., ME II, which was prepared previously by mixing 240 grams of DI water, 17.0 grams of SDS, 591.6 grams of BA, 416.4 grams of MMA, and 12.0 grams of MAA was added to the kettle over 60 min while allowing the temperature to rise to 80° without providing any external heat. Upon completion of ME II, the co-feed solutions were stopped and the batch was held for 5 minutes at 80°. A solution of 5.0 grams of NH4OH mixed with 5.0 grams of DI water was then added to the kettle along with 400 grams of hot DI water (90° C.). At this point ME II, which had been prepared previously by mixing 54.0 grams of DI water, 3.0 grams SDS, 104.4 grams of BA, 75.6 grams of MMA, and 2.5 grams of 4-hydroxy TEMPO was fed to the kettle over 7 minutes. Immediately after the ME III feed was complete, 35.0 grams of NH4OH mixed with 35 grams of DI water was added to the kettle over 2 minutes. When the NH4OH feed was complete (Temperature 72° C.) the batch was held for 5 minutes. The co-feed solutions were then resumed at a rate of 1.2 gram/minute until their completion. The dispersion was then cooled to 25° C. and filtered to remove any coagulum. The filtered dispersion had a solids content of 47.4%. The S/Mil was measured to be 1.52 with collapse of 6%.

EXAMPLE 14

Example 14 was prepared according to the process of Example 13 with the exception that the composition of ME I consisted of 125 grams of DI water, 10.0 grams of SDS, 380.3 grams of STY, 168.0 grams of AN, 7.0 grams of DVB, and 2.8 grams of LOFA. The filtered dispersion had a solids content of 47.3%. The S/Mil was measured to be 1.32 with collapse of 4%.

EXAMPLE 15

Example 15 was prepared according to the process of Example 13 with the exception that the composition of ME I consisted of 125 grams of DI water, 10.0 grams of SDS, 383.6 grams of STY, 168.0 grams of AN, 3.5 grams of DVB, and 2.8 grams of LOFA. The filtered dispersion had a solids content of 47.4%. The S/Mil was measured to be 1.64 with collapse of 11%.

COMPARATIVE EXAMPLE L

Comparative Example L was prepared according to the process of Example 13 with the exception that the composition of ME I consisted of 125 grams of DI water, 10.0 grams of SDS, 385.0 grams of STY, 168.0 grams of AN, 1.75 grams of DVB, and 2.8 grams of LOFA. The filtered dispersion had a solids content of 47.7%. The S/Mil was measured to be 1.82 with collapse of 33%.

EXAMPLE 16

Example 16 was prepared according to the process of Example 13 with the exception that the composition of ME I consisted of 125 grams of DI water, 10.0 grams of SDS, 327.6 grams of STY, 224.0 grams of AN, 3.5 grams of DVB, and 2.8 grams of LOFA. The filtered dispersion had a solids content of 47.9%. The S/Mil was measured to be 1.32 with collapse of 0%.

COMPARATIVE EXAMPLE M

Comparative Example M was prepared according to the process of Example 13 with the exception that the composition of ME I consisted of 125 grams of DI water, 10.0 grams of SDS, 329.0 grams of STY, 224.0 grams of AN, 1.75 grams of DVB, and 2.8 grams of LOFA. The filtered dispersion had a solids content of 47.9%. The S/Mil was measured to be 1.63 with collapse of 33%.

EXAMPLE 17

Example 17 was prepared according to the process of Example 13 with the exception that the composition of ME I consisted of 125 grams of DI water, 10.0 grams of SDS, 271.6 grams of STY, 280.0 grams of AN, 3.5 grams of DVB, and 2.8 grams of LOFA. The filtered dispersion had a solids content of 48.0%. The S/Mil was measured to be 1.35 with collapse of 11%.

COMPARATIVE EXAMPLE N

Comparative Example N was prepared according to the process of Example 13 with the exception that the composition of ME I consisted of 125 grams of DI water, 10.0 grams of SDS, 273.0 grams of STY, 280.0 grams of AN, 1.75 grams of DVB, and 2.8 grams of LOFA. The filtered dispersion had a solids content of 47.9%. The S/Mil was measured to be 1.42 with collapse of 37%.

COMPARATIVE EXAMPLE O

Comparative Example O was prepared according to the process of Example 13 with the exception that the composition of ME I consisted of 125 grams of DI water, 10.0 grams of SDS, 274.4 grams of STY, 280.0 grams of AN, and 2.8 grams of LOFA. The filtered dispersion had a solids content of 47.9%. The S/Mil was measured to be 1.33 with collapse of 49%.

EXAMPLE 18

Example 18 was prepared according to the process of Example 13 with the exception that the composition of ME I consisted of 125 grams of DI water, 10.0 grams of SDS, 243.6 grams of STY, 308.0 grams of AN, 3.5 grams of DVB, and 2.8 grams of LOFA. The filtered dispersion had a solids content of 47.6%. The S/Mil was measured to be 1.15 with collapse of 9%.

EXAMPLE 19

Example 19 was prepared according to the process of Example 13 with the exception that the composition of ME I consisted of 125 grams of DI water, 10.0 grams of Fes-32, 215.6 grams of STY, 336.0 grams of AN, 3.5 grams of DVB, and 2.8 grams of LOFA and ME II consisted of 240 grams of DI water, 17.0 grams of Fes-32, 591.6 grams of BA, 416.4 grams of MMA, and 12.0 grams of MAA The filtered dispersion had a solids content of 47.5%. The S/Mil was measured to be 1.00 with collapse of 7%.

EXAMPLE 20

Evaluation of opacity (S/mil) and collapse of voids in Examples 13-19 and Comparative Examples L-O. S/Mil (opacity) was determined as in Example 6 using the polymeric particles without any co-binder. Examples 13-19 and Comparative Examples L-O have a weight ratio of second shell to the total of all other structures of the polymeric particle of 1:2 and form neat films under the test conditions.

TABLE 20.1

Changes in Process, S/Mil, and % Collapse of Examples 13-19 and Comparative Examples L-O.

| Example | % AN in First Shell Polymer | % MEUM in First Shell Polymer | S/Mil | % Collapse |
|---|---|---|---|---|
| 13 | 20 | 1.0 | 1.52 | 6 |
| 14 | 30 | 1.0 | 1.32 | 4 |
| 15 | 30 | 0.5 | 1.64 | 11 |
| Comp L | 30 | 0.25 | 1.82 | 33 |
| 16 | 40 | 0.5 | 1.32 | 0 |
| Comp M | 40 | 0.25 | 1.63 | 33 |
| 17 | 50 | 0.5 | 1.35 | 11 |
| Comp N | 50 | 0.25 | 1.42 | 37 |
| Comp O | 50 | 0 | 1.33 | 49 |
| 18 | 55 | 0.5 | 1.15 | 9 |
| 19 | 60 | 0.5 | 1.00 | 7 |

All stage ratios are 1 part core polymer/14 parts first shell polymer//30 parts second shell polymer. All second shell feed temperature ranges are 70-80° C.

Examples 13-19 that incorporate 0.5-1% MEUM in the first shell polymer, show superior collapse resistance to Comparative Examples L-O which incorporate 0-0.25% MEUM.

What is claimed is:

1. A polymeric particle comprising a core, a first shell, and a second shell:
- said core comprising, when dry, at least one void;
- said first shell polymer having a calculated glass transition temperature("Tg") greater than 50° C. and comprising, as polymerized units, from 15% to 60%, by weight based on the weight of said first shell polymer, monomer selected from the group consisting of acrylonitrile, methacrylonitrile, acrylamide, methacrylamide, and mixtures thereof; and
- from 0.3% to 10%, by weight based on the weight of said first shell polymer, multiethylenically unsaturated monomer; and
- said second shell polymer having a Tg of from −60° C. to 50° C.;
- wherein the weight ratio of said second shell polymer to the total of all other structures of said polymeric particle is from 0.5:1 to 3:1.

2. The polymeric particle of claim 1 wherein said particle has been formed by a multistage aqueous emulsion polymerization.

3. The polymeric particle of claim 1 wherein said first shell polymer has a calculated glass transition temperature("Tg") greater than 50° C. and comprises, as polymerized units, from 15% to 60%, by weight based on the weight of said first shell polymer, monomer selected from the group consisting of acrylonitrile, methacrylonitrile, and mixtures thereof; and from 0.3% to 10%, by weight based on the weight of said first shell polymer, multiethylenically unsaturated monomer.

* * * * *